March 15, 1966  F. J. CALLAHAN, JR., ETAL  3,240,230

CROSS PATTERN METERING VALVE

Filed Oct. 25, 1962

INVENTORS.
FRANCIS J. CALLAHAN, JR.
& BERNARD J. GALLAGHER

BY

*Fay & Fay*

ATTORNEYS

United States Patent Office 3,240,230
Patented Mar. 15, 1966

3,240,230
CROSS PATTERN METERING VALVE
Francis J. Callahan, Jr., Chagrin Falls, and Bernard J. Gallagher, Cleveland Heights, Ohio, assignors to Nuclear Products Company, Cleveland, Ohio, a corporation of Ohio
Filed Oct. 25, 1962, Ser. No. 233,103
The portion of the term of the patent subsequent to Dec. 25, 1979, has been disclaimed
6 Claims. (Cl. 137—608)

This invention relates to valves of the type particularly useful in metering applications and is more specifically directed to a valve which is known in the trade as a cross pattern metering valve. This application is a continuation-in-part of our copending application S.N. 10,389, filed February 23, 1960, which is now U.S. Patent No. 3,070,-117, issued December 25, 1962.

In its broadest sense the invention contemplates the provision of a valve body having a single inlet and plural outlets with a slender, elongated conical needle received in a passageway which is in communication with the inlet and outlets. Suitable means is provided for highly controlled adjustment of the axial position of the conical needle to insure fine metered flow through the assembly. Additional means is provided to support the stem which carries the elongated needle to insure proper centering of the stem and to minimize friction attendant to the rotary and axial movement thereof.

Suitable means is provided whereby the metering valve assembly may be rapidly mounted on an instrument panel, bulkhead or the like without requiring disassembly thereof. The overall structural relationship of the elements is constructed in accordance with good design to enable the assembly to be as compact as possible without sacrificing the extreme accuracy demanded by most applications. Moreover, additional means is provided whereby the assembly may be further miniaturized in the event such is desirable under the environmental conditions to be encountered.

The instant device presents a number of advantages not found in prior art models of similar structure, performance, and cost. A very high degree of control is maintained by the valve herein disclosed despite its structural simplicity. The difficulty normally encountered in installing metering valves in systems is obviated by the unique design of the valve herein disclosed.

The overall miniaturization of the assembly is accomplished through structural simplicity, resulting in diminished space requirements as well as providing a further advantage in that the dead space is held to an absolute minimum. This feature is exceedingly important since, when an experiment is completed or a new use is required of the valve, it then becomes necessary to purge it in order to remove any deposits of prior fluids. Since the dead space is kept at a minimum and the internal structure is simple, it enables a complete purging to be achieved with a minimum amount of effort, thereby not requiring the disassembly and manual washing of the parts, as was true in prior art models.

Moreover, the valve herein disclosed eliminates expensive fittings in series or parallel installations which heretofore used an angle pattern or straight pattern metering valve. The cost of the fittings, along with the labor necessary to install the same, coupled with the increased space requirements, presented a distinct disadvantage in prior art devices which is obviated by the instant device. Further, the novel construction of the metering valve enables communication to be had between the plural outlets despite the fact that the metering valve is in the closed position.

A large number of designs for metering valves has been proposed in recent years. The increased attention to the development of a metering valve which would be structurally simple and provide satisfactory functional results is due to the commercial demand for metering valves in the fields of instrumentation, research, spectrographic and chromatographic work. While these proposed designs represent considerable progress over the preceding art, it is eminently clear that there remains ample opportunity for improvement in a wide variety of areas.

The above advantages enumerated with respect to the instant device represent but a few of the areas available to those searching for the metering valve which would be sufficiently practical, provide highly accurate functional results, and yet be commercially feasible from the standpoint of cost, production, maintenance and installation.

It is therefore a general object of this invention to provide a metering valve which is structurally and operationally simple and which is further characterized by its ease of installation and maintenance, as well as its low cost of production.

It is a further object of this invention to provide a metering valve which will meter flow in two directions.

It is a still further object of this invention to provide a metering valve which will allow communication of flow between the plural outlets, notwithstanding the fact that the valve is in the closed position.

It is a further object of this invention to provide a metering valve which, because of its structural makeup, is exceedingly simple to install and further which eliminates costly connections and fittings.

It is a further object of this invention to provide a metering valve which will have a minimum of dead space therein.

It is a further object of this invention to provide a metering valve, the stem of which is supported by a low friction bushing, thereby facilitating easy adjustment.

It is a still further object of this invention to provide a metering valve which will have plural distinct seals, thereby precluding leakage in the event the first seal fails.

It is a further object of this invention to provide a metering valve which has exceedingly fine control in metering operations.

It is a further object of this invention to provide a metering valve which will be quickly and conveniently installed.

It is a still further object of this invention to provide a valve of the type described which provides for fine flow control characteristics through the use of a generally conical needle point which seats against the orifice of the valve.

It is a still further object of this invention to provide a stop means to prevent overseating of the slender conical stem of the metering valve.

It is a still further object of this invention to provide a metering valve wherein the movable portion of the valve is harder than the cooperating seat in the valve body.

Other and fuller objects of the invention will become readily apparent when reference is made to the description below and the accompanying drawings, wherein.

Figure 1:
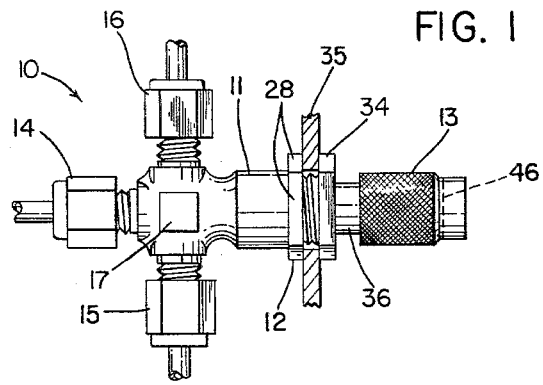
FIG. 1 is a view in elevation of the cross pattern metering valve with fragmentary portions of the mounting bulkhead in cross section.

Referring now more particularly to the drawings, a valve 10 is shown which includes a body portion 11, bonnet member 12, an actuating cap member 13. The body is provided with a single inlet indicated generally at 14 and plural outlets at 15 and 16. The fragmentary portions of the incoming and outgoing lines are illustrated as inserted in "Swagelok" fittings on the body member 11. This is by way of example only, since any suitable type of fitting, such as male thread, female thread, or the like, may be provided. A central tool pad 17 is shown on the body portion to receive suitable tool means when the connection or installation of the valve is taking place.

Figure 2:
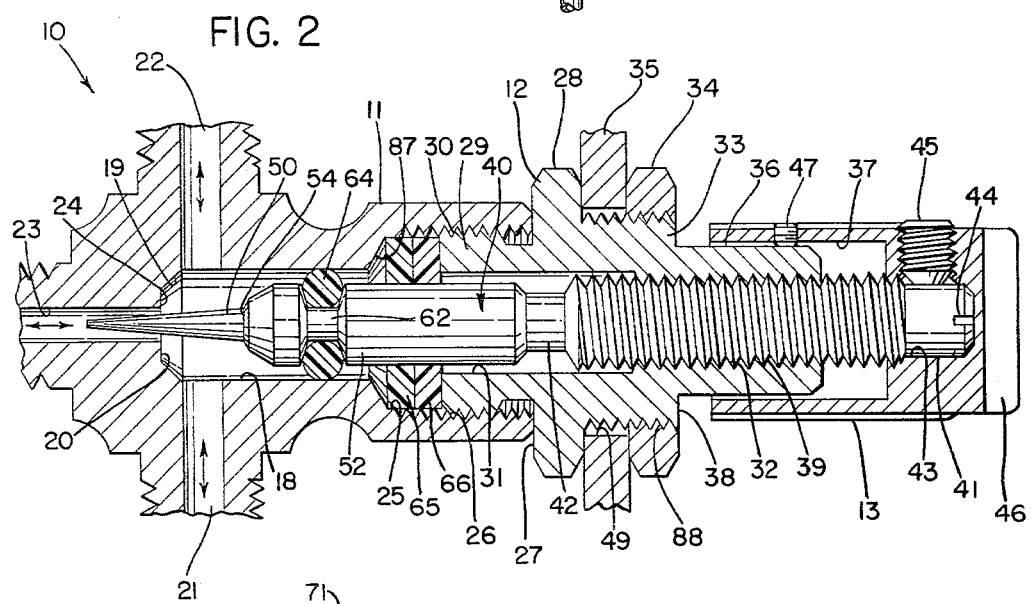
FIG. 2 is an enlarged cross-sectional view of the valve shown in FIG. 1, with the stem shown in elevation for clarity.

Referring now to FIG. 2, therein is shown an enlarged cross-sectional view of the valve 10 of FIG. 1. The body is provided with a central bore 18 which is of a cylindrical configuration and merges with a frusto-conical and radial shoulder portion 19 and 20 respectively. Side ports 21 and 22 communicate with the passageway 18 and with each other through the passageway. The radial shoulder 20 merges sharply with an additional port 23 to form a sharp seating surface 24. The opposite end of the passageway 18 flares outwardly into frusto-conical surface 87 and thence into a generally cylindrical surface 25 which is internally threaded as at 26.

The bonnet 12 has a radially extending flange 27 provided with shoulder portion 27' which is provided with tool pads 28 to assist in the installation of the bonnet 12 to the body 11. An axially extending portion 29 is threaded as at 30 to cooperate with the threads 26 of the body portion. A central passage or bore 31 extends through the bonnet and is reduced and very finely threaded as at 32. The bonnet 12 has a cylindrical extension 33 which is adapted to receive a jam nut 34 grippingly to engage the fragmentary portion of the wall 35 to mount the valve assembly. The extension 33 is reduced as at 36 to project within a bore 37 provided in the cap member 13.

As illustrated, the bonnet member 12 is generally cylindrical in form and is provided intermediate its ends with a radially extending flange 27 which is adapted to abut the end face of the body member 11 when the threads 26 and 30 are fully engaged. Tool pads 28 or other suitable wrench engaging means may be provided along the external periphery of the flange 27, if desired, to facilitate the assembly of the bonnet 12 into the body 11. The bonnet member 12 is provided with a second set of threads 88 or other suitable connecting means located adjacent the flange 27 on the side opposite the threads 30. The threads 88 have been illustrated as being somewhat larger in diameter than the threads 30; however, it is obvious, of course, that this relationship need not necessarily exist.

The outer end portion 36 of the bonnet is provided with a generally cylindrical external configuration and is somewhat reduced in diameter with respect to the second threaded area 88 so as to produce a radial stop shoulder 38 for purposes hereinafter noted. Relatively fine internal thread means 32 are provided in the bore 31 for cooperation with similarly fine thread means 39 provided on the stem member indicated generally at 40.

As best seen in FIG. 2, the bore 31 of the bonnet is substantially coaxial with the bore 18 of the body portion when the bonnet is screwed into the body 11. The stem 40 is of an elongated generally cylindrical form and of a size to be received slidably in the bore 31 and 18 provided in the bonnet member 12 and body member 11, respectively. The stem 40 is provided at its outer end with a smooth unthreaded cylindrical portion 41 of a slightly reduced diameter with respect to the major diameter of the threads 39.

Stem member 40 is provided at its inner end with a generally conical needle 50 joined to the central portion of the stem 52 by means of a frusto-conical shoulder 54. The generally conical needle point 50 diverges in a direction towards the bonnet member 12 and at its free end is somewhat smaller in diameter than the passageway 23, so that the end adjacent the shoulder 54 is somewhat larger. Intermediate its free end and the shoulder 54, the needle point 50 is of a diameter equal to that of the passageway 23.

The central portion 52 of the stem 40 is about the same diameter as the major diameter of the threads 39, but is separated therefrom by means of a reduced diameter portion 42. The reduction in diameter at 42 limits the withdrawal of the stem to the threaded portion 32 of the bonnet, preventing accidental removal thereof, and further preventing the stem from being withdrawn a sufficient distance to expose the threads 40 to the exterior of the valve.

A circumferentially extending groove 62 formed in the central portion 52 of the stem adjacent the shoulder 54, and near the seating lip 24 when the valve is assembled, receives an annular sealing element 64 which is illustrated in the drawing as being of the O-ring variety. The central portion of the stem 52 is further supported by a pair of sealing rings 65 and 66 squeezed between the shoulder 87 and the terminus of the cylindrical bonnet 29. It is contemplated that the rings 65 and 66 in the instant embodiment be of a low friction material, such as Teflon or the like, to insure ease of operation while providing support for the stem 40. An additional function is served by the sealing rings 65 and 66 inasmuch as failure of the O-ring 64 would normally allow fluid to contaminate the threads 39. However, because of the auxiliary sealing characteristics of sealing rings 65 and 66, this is prevented.

Cap member 13 is provided with the counterbore 37 and a further reduced counterbore 43 to receive the smooth end of the cylindrical extension 41. The smooth cylindrical extension 41 on the stem 40 is provided with a tool slot 44 which may be used for adjusting in close quarters in the absence of the cap 13. The cap member is connected to the cylindrical extension 41 of the stem 40 by a suitable set means, such as a set screw 45. A tool slot 46 is provided in the end of the cap 13 to allow adjustment in unaccessible places and under high temperature applications. A further set screw 47 extends through the body 11 of the cap member 13 and is adapted to cooperate with the cylindrical portion 36 of the bonnet so that once the flow is set at the desired rate, it may then be locked in place.

The end 48 of the cap member cooperates with the abutment 38 on the bonnet to prevent over-tightening of the needle in the seat 24. The cap member 13 closely received over the cylindrical extension 36 of the bonnet provides a tortuous path for dust, dirt and other foreign matter which could contaminate the threads 39 causing binding and the like.

It will be observed from the examination of the drawing that the diameter of the externally threaded portion 88 of the bonnet member 12 is slightly larger than the greatest diameter of the cap 13, and, of course, slightly smaller than the diameter of the opening 49 in the bulkhead 35. This allows the valve to be mounted on the bulkhead 35 without requiring removal of the cap, inasmuch as the cap 13 will easily pass through the aperture 49 in the bulkhead, as well as the aperture in the jam nut 34.

In a typical embodiment of the invention, the threads 32 and 39 would be of the order of 40 pitch to impart a micrometer-like control to the extension and retraction of the stem 40 through the operation of the cap 13. The diameter of the passageway 23 receiving the needle 50 would be about 0.055", and the length of this section would be from about 0.325" to 0.340". The taper on the needle point 50 would be formed on an included angle of about 3°. In order to prevent repeated seatings from scoring the needle point and interfering with the efficient operation of the metering valve, it has been found extremely desirable to construct the stem 40 from a harder material than the body 11. In a typical embodiment, the body would be constructed from brass or the like, where the stem would be constructed from stainless steel. Of course, similar materials could be used for both the stem and the body with the needle 50 being case hardened or the like. It is realized, of course, that the various dimensions and material set forth hereinabove are given by way of illustration only, and are not meant to be restrictive.

Figure 3:
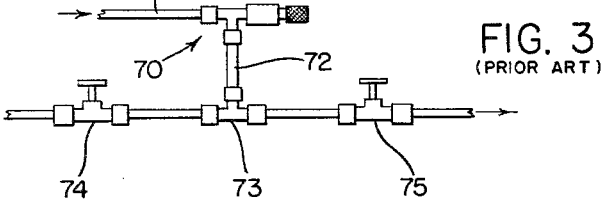
FIG. 3 is a schematic view of a prior art system employing a straight pattern metering valve.
Figure 4:
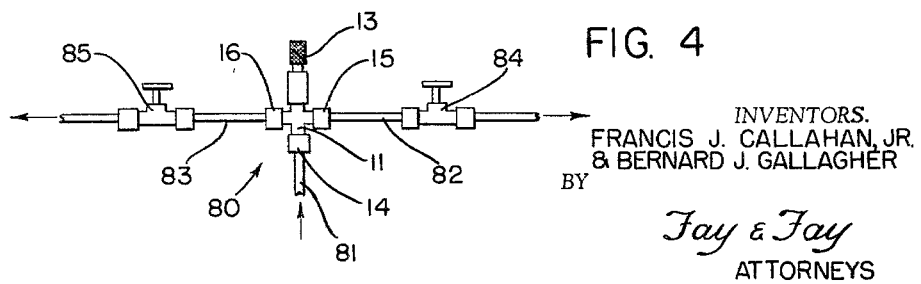
FIG. 4 is a schematic view of a system like that of FIG. 3 wherein the cross pattern metering valve of the instant case is utilized.

Referring now to FIGS. 3 and 4, a typical application of the cross-pattern metering valve (FIG. 4) is compared with a prior art setup (FIG. 3) intended to achieve a like result. The prior art arrangement consists of a metering valve shown at 70 with inlet 71 and outlet 72, which communicates with a T-coupling 73, having two outlets directed to valves 74 and 75 to distribute the fluid. In the embodiment of FIG. 4, the novel metering valve 80 of the instant invention has an inlet portion 81 and outlets 82 and 83. The outlets 82 and 83 communicate directly with conventional valves 84 and 85, respectively. It is obvious that flow may be reversed in the event that mixing is desirable. One salient feature of the instant application shown in FIG. 4 is that communication may be had between the valves 84 and 85 through the metering valve even though flow is terminated through the inlet 81. It is further obvious, because of the symmetrical construction of the bore 18, that the fluid will be evenly distributed between the outlets 82 and 83 while the converse is true when flow is reversed in the system.

FIG. 4 schematically illustrates that the T-fitting 73 of FIG. 3 may be omitted when a valve of the instant embodiment is used in a like test setup. It is readily apparent that the space requirements of the test setup of FIG. 3 are far less than the known prior art models, as well as doing away with the expensive T-fitting and the additional connecting conduit 72. This is but one illustration of the usefulness of the cross pattern metering valve described above.

In operation, the valve embodying the principles of this invention is exceedingly reliable and efficient. When the slender needle-like stem 50 is seated against the lip 24, flow through the passageway 22 is terminated without interruption of the communication between the passages or side ports 21 and 22. The sealing engagement of the slender needle with the seat 24 establishes substantial line contact or sealing on the needle intermediate its ends in response to clockwise rotation of the cap 13. However, the stem 40 may be retracted, as seen in FIG. 2, by counterclockwise rotation to break the sealing engagement between the needle point 50 and the seating lip 24, thereby allowing fluid to flow through the passageway 23 into the passageways 21 and 22.

The annular seat 24 serves as an orifice where the needle acts as a means to control or meter the flow of fluids through the orifice. During the extension and retraction of the stem 40, the low friction seals 65 and 66 slidably support the stem so as to assist in keeping the conical needle positioned centrally of the passageway 23. The low friction effect of the seals 65 and 66 insures smooth, efficient operation, as well as precluding leakage in the event of the failure of the primary seal means 64.

The abutment 48 on the end face of the cap 13 cooperates with the radial stop shoulder 38 when the valve is in the closed position to prevent over-tightening or over-extension of the needle point 50 into the passageway 23, thereby guarding against damage to either the needle point or the annular lip. Because of the slender conical design of the needle point 50 and the sealing occurring at a point intermediate its ends, there is sufficient allowance for the ordinary wear of the seat 24 and the needle point. As the diameter of the seat becomes enlarged and the diameter of the needle point becomes reduced, the needle point need merely be extended a greater distance into the passage 23 to allow seating to be established on a line near the shoulder 54. In some instances, of course, it may be necessary to adjust the position of the cap 13 on the smooth cylindrical portion 41 of the stem 40 in order to adjust the abutment on the end face 48 of the cap 13 to allow the needle to extend into seating engagement with the seat 24.

Experimentation has shown that a valve constructed in accordance with this invention allows exceedingly accurate control of fluid flow. It must be remembered, however, that in order to obtain control, it is necessary that care be taken in the construction of the various parts of the valve in order to provide satisfactory accuracy with respect to such matters as the machining of the needle point 50 and passageway 23 in order that the desirable finish and alignment of these components may be provided.

The installation of the valve point according to the principles of the invention is greatly facilitated and at the same time may be mounted on a bulkhead or panel without the necessity of disassembling the valve. This result is obtained by the proportioning of the external diameter of the cap 13 and the threads 88 so as to allow clamping between the nut 34 and the radial shoulder 27 on the bonnet.

For the purpose of illustration, certain terminology and certain concrete embodiments have been employed in the description of the inventive principles herein involved. It will become immediately obvious, however, to one possessing but ordinary skill in the art that a number of departures could be made with respect to the terminology and illustrative embodiments employed without, at the same time, departing from the true scope of the invention. It is not intended, therefore, that the specific illustrative embodiments or descriptive terminology employed be limiting, but that the scope of the invention be defined by the spirit and scope of the appended claims.

We claim:

1. In a valve device, a housing having a plurality of adjacent coaxially aligned bore sections, with each successive bore section being reduced in diameter with respect to the next adjacent bore section and being joined thereto by generally radially extending shoulder means, a bonnet member received and secured in the largest bore in said housing, said bonnet member including a central bore section coaxially aligned with said bore sections in said housing, an annular seating lip formed by the shoulder means interconnecting the smallest diameter bore with an intermediate diameter bore section next adjacent thereto, an elongated stem reciprocally received within said bore sections in said housing and bonnet, secondary sealing means spaced from said seating lip and interposed between the end of said bonnet member and the shoulder means interconnecting the largest bore section with the next adjacent bore section, said secondary sealing means engaging said stem and of sufficient rigidity so as to provide a low friction support therefor and for a primary seal and to provide a secondary seal between said stem, said housing and said bonnet, said stem being provided at one end with a generally conical needle member opposed to and coaxially aligned with said smaller diameter bore section, and converging in the direction of the diametral reduction of successive bore sections, the diameter of the conical needle member at its smallest value being less than the diameter of said smaller diameter bore section, and at its largest value being greater than the diameter of said smaller diameter bore section, said stem being provided with a groove adjacent the needle member an O-ring, primary sealing means in said groove and sealingly engaging the intermediate bore to provide a primary seal between said stem, said housing and said bonnet, a pair of fluid outlet passageways intersecting the intermediate diameter bore section between said primary sealing means and said seating lip, means for establishing fluid conducting communication between said smaller diameter bore section and a fluid inlet passageway, means including the intermediate diameter bore for establishing fluid conducting communication between the inlet passageway and said pair of fluid outlet passageways, and means for axially extending and retracting the stem whereby to move a portion of the needle member intermediate its ends into and out of substantially line contact fluid sealing engagement with the annular seating lip, said primary sealing means being positioned, when the needle engages the annular seating lip, between the secondary sealing means and the intersection of the outlet passageways with the intermediate bore, with communication between said outlet passageways being uninterrupted.

2. The valve of claim 1 wherein the conical needle member is substantially harder than said seat.

3. The valve of claim 1 wherein the means to extend and retract said stem slidably through said secondary sealing means includes fine thread means and a dustproof operating cap connected to said stem and having a portion thereof in close slidable engagement with said bonnet to prevent foreign matter from reaching said thread means.

4. The valve of claim 3 wherein said dustproof cap is provided with locking means.

5. The valve of claim 3 wherein said stem and said dustproof cap are provided with tool slot means.

6. The valve of claim 1 wherein said primary sealing means is positioned closely adjacent said orifice to facilitate purging of the valve.

References Cited by the Examiner

UNITED STATES PATENTS

| | | | |
|---|---|---|---|
| 2,567,036 | 9/1951 | Shannon | 277—110 X |
| 2,676,781 | 4/1954 | Hobbs | 251—210 |
| 2,767,019 | 10/1956 | Manville | 137—610 X |
| 2,839,265 | 6/1958 | Hobbs | 251—191 X |
| 2,948,556 | 8/1960 | Epain et al. | 251—214 X |
| 2,953,165 | 9/1960 | Reynolds | 251—191 X |
| 2,958,504 | 11/1960 | Lindgren | 251—223 |
| 2,970,609 | 2/1961 | Beremand | 251—112 X |
| 3,070,117 | 12/1962 | Callahan et al. | 137—360 |

ISADOR WEIL, *Primary Examiner.*